(12) United States Patent
Obrist et al.

(10) Patent No.: US 11,781,298 B2
(45) Date of Patent: Oct. 10, 2023

(54) FITTING WITH AUTOMATIC OBJECT RECOGNITION AND METHOD FOR CONTROLLING A FITTING BY MEANS OF AUTOMATIC OBJECT RECOGNITION

(71) Applicant: OBLAMATIK AG, Chur (CH)

(72) Inventors: Roland Obrist, Scharans (CH); Daniel Knupfer, Zizers (CH); Philipp Triet, Bad Ragaz (CH); Patric Cathomas, Flims (CH)

(73) Assignee: OBLAMATIK AG, Chur (CH)

( * ) Notice: Subject to any disclaimer, the term of this patent is extended or adjusted under 35 U.S.C. 154(b) by 215 days.

(21) Appl. No.: 17/319,723

(22) Filed: May 13, 2021

(65) Prior Publication Data

US 2021/0355663 A1    Nov. 18, 2021

(30) Foreign Application Priority Data

May 18, 2020   (CH) .................................... 00602/20

(51) Int. Cl.
*E03C 1/05*    (2006.01)
*G06T 7/70*    (2017.01)
*E03C 1/04*    (2006.01)

(52) U.S. Cl.
CPC ............ *E03C 1/057* (2013.01); *E03C 1/0408* (2013.01); *G06T 7/70* (2017.01); *G06T 2207/10021* (2013.01); *G06T 2207/20084* (2013.01)

(58) Field of Classification Search
CPC ...................................................... E03C 1/057

USPC ............ 4/623, 619, 302, 313, 668; 251/131
See application file for complete search history.

(56) References Cited

U.S. PATENT DOCUMENTS

| | | | |
|---|---|---|---|
| 5,107,894 A * | 4/1992 | Hochstrasser | F16K 31/088 251/65 |
| 7,228,874 B2 * | 6/2007 | Bolderheij | E03C 1/055 222/145.5 |
| 2004/0025248 A1 * | 2/2004 | Lang | E03C 1/05 4/623 |
| 2010/0180367 A1 * | 7/2010 | Elsener | E03D 5/105 4/302 |

FOREIGN PATENT DOCUMENTS

| | | | | |
|---|---|---|---|---|
| EP | 2543779 A2 * | 1/2013 | | E03B 7/045 |
| EP | 3964653 A1 * | 3/2022 | | A47K 5/1217 |
| WO | WO-03106772 A1 * | 12/2003 | | E03C 1/057 |
| WO | WO-2006058650 A1 * | 6/2006 | | E03C 1/04 |
| WO | WO-2008107188 A1 * | 9/2008 | | E03C 1/057 |

* cited by examiner

*Primary Examiner* — Lori L Baker
(74) *Attorney, Agent, or Firm* — Notaro, Michalos & Zaccaria P.C.

(57) ABSTRACT

A fitting, in particular an outlet fitting, for a sanitary installation has a control unit, a sanitary element controllable with the control unit, and at least one imaging sensor. The control unit is adapted to trigger an action of the sanitary element depending on an object recognition based on at least one output signal from the at least one imaging sensor. A fitting arrangement with such a fitting as well as a method for controlling such a fitting are also provided.

23 Claims, 5 Drawing Sheets

FITTING WITH AUTOMATIC OBJECT RECOGNITION AND METHOD FOR CONTROLLING A FITTING BY MEANS OF AUTOMATIC OBJECT RECOGNITION

FIELD OF THE INVENTION

The present invention relates to a fitting, in particular an outlet fitting, for a sanitary installation, a fitting arrangement having a fitting according to the invention, and a method for controlling a fitting according to the invention.

BACKGROUND OF THE INVENTION

In sanitary engineering, components used to change and control material flows (e.g. fluids, i.e. liquids or gases) are referred to as fittings. They are used in particular on pipelines and boilers. So-called outlet fittings are also known in the household as faucets, shower or bathtub inlet fittings, depending on the application. Combined hot and cold water outlet valves are often called mixer taps. Depending on where they are used, fittings are more specifically referred to as kitchen faucets or bathroom faucets, for example. A fitting typically includes an operating unit and/or a control unit and a sanitary element controllable by the control unit, such as a pipe with a valve that is used to regulate the flow of a fluid.

It is known to operate sanitary systems by means of electronic control units. It is desirable that the respective user can trigger predetermined functions without contact. Infrared sensors or capacitive sensors are often used for this purpose, which react to the user's approach to the sensor. Recently, however, voice-controlled faucets have also become available, which can be controlled by voice command using voice assistants such as Amazon Alexa, Apple Siri or Google Assistant. This means that the user always has two hands free and does not have to touch any controls, which has practical and hygienic advantages. However, in noisy environments (such as public restrooms), voice recognition is often impaired, making voice control unreliable. There is also a need for improved automatic support in the use of fittings in very different applications. In particular, it would be desirable if the fitting could automatically recognize and trigger or execute a variety of different actions desired by the user.

SUMMARY OF THE INVENTION

It is therefore an object of the present invention to provide a fitting for a sanitary installation which automatically assists a user in using the fitting, so that the fitting can be controlled in particular without contact. Moreover, such a fitting should be able to be used in many different fields of application. According to the invention, this object is solved by the fitting defined in claim 1.

It is a further object of the present invention to disclose a fitting arrangement comprising a sanitary installation and a fitting. Such a fitting arrangement is disclosed in claim 13.

It is a further object of the present invention to propose a method which automatically assists a user in the use of a fitting, so that the fitting can be controlled in particular without contact. According to the invention, this object is solved by the method proposed in claim 15.

Specific embodiment variants of the present invention are given in the dependent claims.

A fitting for a sanitary installation according to the invention comprises a control unit and a sanitary element controllable with the control unit. In addition, the fitting has at least one imaging sensor. The control unit is adapted to trigger an action of the sanitary element depending on an object recognition based on at least one output signal from the at least one imaging sensor. The imaging sensor is used to detect a scene in a spatial area of the fitting, for example in an outlet region of the fitting.

For example, the fitting may be a faucet, a shower or bathtub inlet fitting, but it may also be a part (e.g., a spout) of a soap, lotion, or disinfectant dispenser, or a part (e.g., an air nozzle) of a hand or hair dryer.

In one embodiment variant of the fitting, the at least one imaging sensor is a 2D or 3D/stereo (optical) camera (for the visible light range), a thermal imaging camera (for the infrared/IR light range), an ultrasonic sensor, a radar sensor, or a laser distance measurement sensor, in particular a LIDAR (=light detection and ranging) or ToF (=time of flight) sensor or a laser scanner, or a combination of said sensor types. If only one sensor (element) is used to detect a scene in a spatial region of the fitting, it is particularly adapted to successively (and periodically) scan (i.e., spatially scan) the spatial region, e.g., by changing the direction in which a sensor signal is picked up over time, thereby capturing a two-dimensional (or three-dimensional) image of the spatial region (consisting of multiple pixels or voxels). For example, a combination of a 2D optical camera and a ToF sensor (which can be oriented in different spatial directions) can also be used for additional distance measurement. In particular, a plurality of ToF sensors can also be used to determine multiple distances in different directions simultaneously.

In a further embodiment variant, the fitting additionally comprises an illumination unit for illuminating objects, wherein the illumination unit comprises in particular one or more LEDs (light emitting diodes) or laser diodes or an ultraviolet/UV or infrared/IR light source.

In a further embodiment variant, the fitting additionally comprises an image processing unit to perform the object recognition. The image processing unit may comprise, for example, a microprocessor/controller (MPU/MCU) or signal processor (DSP), wherein these are programmable. Alternatively (or additionally), the image processing unit may comprise application-specific hardware, such as an ASIC or FGPA (field-programmable gate array). The image processing unit may also be implemented as part of the control unit. The image processing unit and/or the control unit may be commonly referred to as the processor(s) of the fitting.

In a further embodiment variant, the fitting additionally comprises a communication unit for sending the at least one output signal from the at least one imaging sensor to a remote image processing unit, e.g. a server, in particular in the cloud, for object recognition and for receiving a result of the object recognition.

In a further embodiment variant of the fitting, the image processing unit is adapted to perform object recognition by means of a neural net/network, in particular by means of a neural net/network trained before commissioning (e.g. by the manufacturer) of the fitting.

In a further embodiment variant of the fitting, the neural net/network is a self-learning neural net/network, wherein in particular so-called "reinforced learning" can be executed. In this case, the user provides feedback to the control unit or the image processing unit or the unit performing the object recognition, with which the user indicates whether the action triggered by the control unit was correct or not. The feedback from the user can be picked up by the imaging sensor, for example, in that the user covers the imaging sensor with his hand for a short time if the triggered action was incorrect.

In a further embodiment variant, the fitting additionally comprises a microphone with which the user can, in particular provide feedback to the control unit, wherein the control unit is adapted, in particular to detect clapping and/or whistling noises based on an output signal from the microphone.

In a further embodiment variant of the fitting, the image processing unit is adapted to perform an object classification as part of the object recognition in order to assign an object to a specific class from a plurality of predefined classes. In this context, each object class comprises a specific type of object.

In a further embodiment variant of the fitting, the object classification can be used to recognize different classes of kitchen utensils, such as plates, glasses, cups, cutlery, cooking pots, pans, etc., or of limbs, such as hands (including individual fingers), arms, feet or legs, of a user of the fitting, or of cleaning utensils, such as a cleaning brush, a cleaning sponge, steel wool or a cleaning cloth.

In a further embodiment variant of the fitting, the image processing unit is adapted to determine at least one property of an object, such as transparency, color, size, or degree of contamination.

In a further embodiment variant of the fitting, the image processing unit is adapted to determine a position, in particular relative to a reference position, and/or a movement of an object.

In a further embodiment variant of the fitting, the control unit is adapted to trigger a specific action of the sanitary element depending on the object classification and/or the property of the object and/or the position of the object and/or the movement of the object.

In a further embodiment variant of the fitting, one or more of the following actions can be triggered:
  Selecting a preset of the sanitary element and executing a behavior of the sanitary element defined according to the preset;
  Dispensing a specified amount of a fluid;
  Dispensing a specified amount of a fluid per unit of time;
  Dispensing a fluid with a preset maximum, minimum or preferred temperature of the fluid to be dispensed;
  Dispensing a specified fluid from a plurality (i.e., two or more) of different fluids, particularly depending on a position of the object, such as a hand of the user;
  Switching on and/or off the delivery of a fluid.

Fluids are understood to be gases (e.g. air or ozone), liquids (e.g. water or disinfectant) and/or gas/liquid mixtures (sparkling water). Instead of fluids, the fitting may be adapted to dispense fine-grained solids (such as powder or sand). However, in the context of the present invention, fluids may also include viscous substances such as soaps, lotions, creams and pastes.

According to a further aspect of the present invention, a fitting arrangement comprises a sanitary installation and a fitting according to one of the embodiments listed above, wherein the (at least one) imaging sensor is arranged in such a way that an inlet region, in particular for dispensing a fluid, and/or an outlet region, in particular for leading away the dispensed fluid, of the fitting is/are detectable by the (at least one) imaging sensor.

In one embodiment variant of the fixture arrangement, the sanitary installation is a sink or washtub, bidet, shower, bathtub, soap dispenser, lotion dispenser, disinfectant dispenser, hand dryer, hair dryer, toilet, shower toilet, urinal, or washing facility.

According to another aspect of the present invention, a method for triggering an action of a sanitary element of a fitting according to any of the above embodiments comprises the following steps:
  Detecting a scene at the sanitary element having at least one imaging sensor, in particular in an inlet region and/or an outlet region of the fitting, wherein the scene is detected by means of one or more images as output of the at least one imaging sensor, wherein, in particular in the case of several images, these are recorded in a time-staggered manner, e.g. as a film or video, or (simultaneously) from different viewing angles;
  Performing object recognition to recognize at least one object, such as a hand of a user of the fixture, a kitchen utensil, or a cleaning utensil; and
  Triggering an action of the sanitary element depending on the object recognition.

In one embodiment variant of the method, the scene is illuminated by means of an illumination unit, in particular one or more LEDs or laser diodes or a UV or IR light source.

In a further embodiment variant of the method, the scene recorded by the at least one imaging sensor is sent as an output of the at least one imaging sensor to a remote image processing unit, e.g., a server, in particular in the cloud (i.e., IT infrastructure made available, for example, over the Internet), for object recognition, and a result of the object recognition is received by the remote image processing unit.

In a further embodiment variant of the method, the object recognition is performed by means of a neural net/network, in particular by means of a neural net/network trained before the fitting is put into operation (e.g. by the manufacturer).

In another embodiment of the method, an object classification is performed as part of the object recognition process to assign an object to a particular class from a plurality of predefined classes.

In a further embodiment variant of the method, different classes of kitchen utensils, such as plates, glasses, cups, cutlery, cooking pots, pans, etc., or of limbs, such as hands (including individual fingers), arm, feet and legs, of a user of the fitting or of cleaning utensils, such as a cleaning brush, a cleaning sponge, steel wool or a cleaning cloth, are recognized by means of the object classification.

In a further embodiment variant of the method, at least one property of an object, such as transparency, color, size or degree of soiling, is determined.

In a further embodiment variant of the method, a position, in particular relative to a reference position, and/or a movement of an object is determined.

In a further embodiment variant of the method, a specific action of the sanitary element is triggered depending on the object classification and/or the property of the object and/or the position of the object and/or the movement of the object.

In a further embodiment variant of the method, the action comprises at least one of the following:
  Selecting a preset of the sanitary element and executing a behavior of the sanitary element defined according to the preset;
  Dispensing a specified amount of a fluid;
  Dispensing a specified amount of a fluid per unit of time;
  Dispensing a fluid with a preset maximum, minimum or preferred temperature of the fluid to be dispensed;
  Dispensing a particular fluid from a plurality (i.e., two or more) of different fluids, particularly depending on a position of the object, such as a hand of the user;
  Switching on and/or off the delivery of a fluid.

In a further embodiment variant, the method additionally comprises at least one of the following steps:

Capturing with the (at least one) imaging sensor or a separate camera (independent of the fitting), e.g. a camera of a smartphone, images (or film or videos) of a new, i.e. previously unknown, object;

Transmitting training data, e.g. the previously recorded images (or movie or video) of a new, i.e. previously unknown, object, to a (remote) server, optionally with an indication regarding the (object) class to which the training data is assigned;

Processing training data to create a trained neural net/network, e.g., in the form of a TensorFlow Lite model;

Transmitting a trained neural net/network, e.g. in the form of a TensorFlow Lite model, from the (remote) server to the fitting;

Assigning a specific object (or a gesture concerning this object) to a specific action for the control unit, in particular by the user, for example by means of a web app or a mobile app (application software for mobile devices) on a smartphone.

It should be noted that combinations of the above embodiment variants are possible, which in turn lead to more specific embodiments of the present invention.

BRIEF DESCRIPTION OF THE DRAWINGS

Non-limiting exemplary embodiments of the present invention are explained in further detail below with reference to figures, wherein.

In the figures, the same reference numerals stand for the same elements.

DETAILED DESCRIPTION OF THE INVENTION

Figure 1:
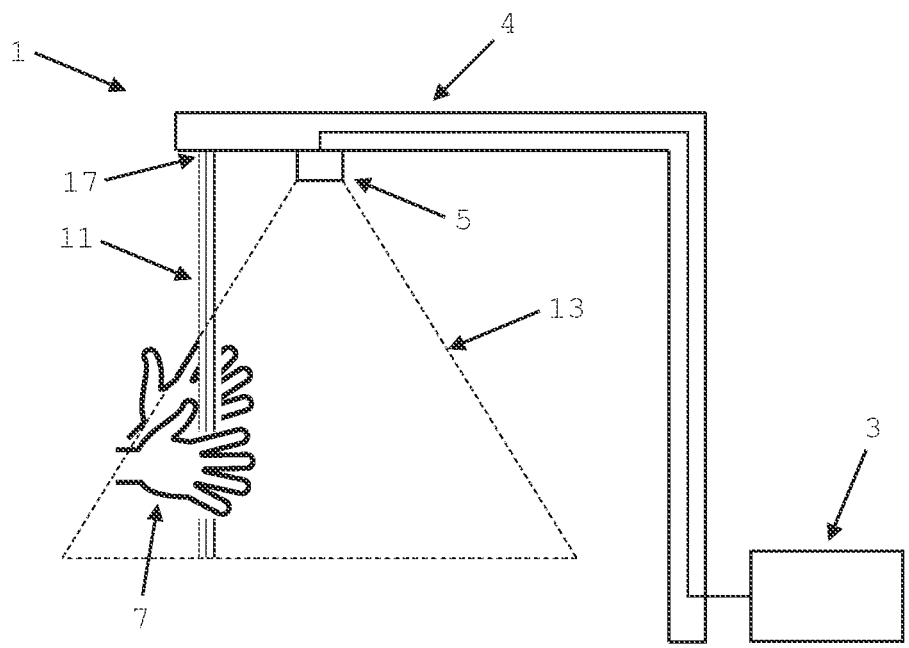
FIG. 1 shows a schematic representation of a first exemplary embodiment of a fitting for a sanitary installation according to the invention.

In order to explain the basic principle of the present invention, FIG. 1 shows in a schematic representation a first simple exemplary embodiment of a fitting 1 according to the invention for a sanitary installation, such as a washbasin for a bathroom or a sink for a kitchen. In the present case, the fitting 1 is by way of example a spout fitting (also called a faucet). The fitting 1 comprises a sanitary element 4 in the form of a pipe with an outlet 17 for a liquid 11, for example water. The flow rate of the liquid 11 exiting the outlet 17 is regulated by a valve (not shown in FIG. 1). The valve in turn is adjusted by a control unit 3. Normally, the valve is controlled by a manual control element which has to be operated by a user. Alternatively, the valve is triggered automatically, for example by means of a proximity sensor, such as an infrared/IR sensor. According to the present invention, an imaging sensor 5, such as a camera, is now used to trigger the valve via the control unit 3. For this purpose, the output signal of the imaging sensor 5, e.g. one (or more) 2D image(s) or a film or video (i.e. a temporal sequence of images) is analyzed and an object recognition is performed, for example to detect the presence of hands 7 under the outlet 17. Depending on the result of the object recognition, the valve is opened via the control unit 3 to allow the user to wash the hands 7. As soon as the user leaves the hands 7 from the inlet region 13, which is detected and monitored by the imaging sensor 5, this is detected by the object recognition system and the valve is closed again via the control unit 3 so that no more liquid 11 escapes from the outlet 17.

The advantage of object recognition is now that different actions can be performed depending on the detected object and its movement(s). For example, the flow rate of water can be controlled by the imaging sensor 5 depending on the distance of the object 7 (e.g., the hands)—e.g., the further away the hands are from the camera 5, the more water is dispensed per unit time. In addition, for example, in the case of a mixing faucet, i.e., a combined hot- and cold-water outlet valve, the water temperature can be adjusted depending on a movement of the object 7, for example—e.g., a movement/shift of the hands 7 to the right leads to colder water and a movement/shift of the hands 7 to the left leads to warmer water.

Figures 2A, 2B:
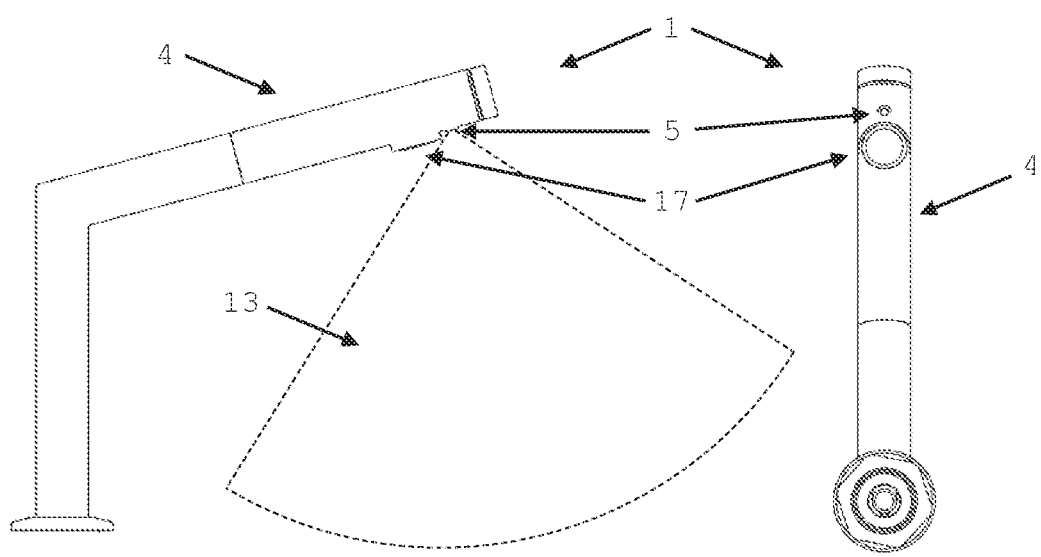
FIG. 2a) shows a representation in a side view of a second exemplary embodiment of a fitting according to the invention for a sanitary installation, such as a wash basin or sink.
FIG. 2b) shows a representation in a bottom view of the second exemplary embodiment.

FIG. 2a) shows a side view and FIG. 2b) shows a bottom view of a second exemplary embodiment of a fitting 1 according to the invention for a sanitary installation, such as a wash basin or sink. As in the example according to FIG. 1, the imaging sensor 5 (e.g. camera) is also arranged here on the outlet pipe near the outlet 17 of the sanitary element 4—in FIGS. 2a) and 2b) above the outlet 17 and in FIG. 1 below the outlet 17, so that the inlet region 13 can be completely covered by the imaging sensor 5 (e.g. camera).

Figure 3:
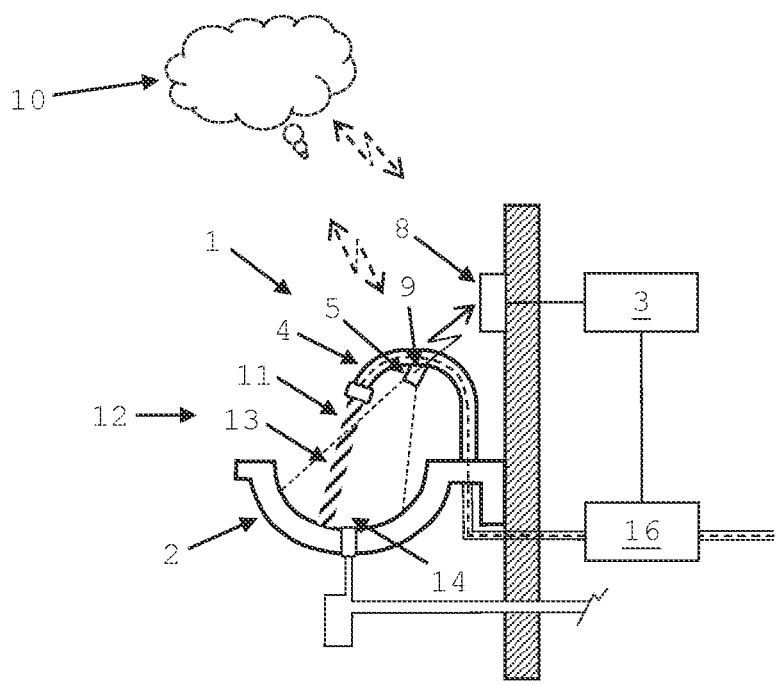
FIG. 3 shows a schematic representation of a third exemplary embodiment of a fitting according to the invention for a sanitary installation, such as a washbasin in a bathroom or public washroom.
Figure 4:
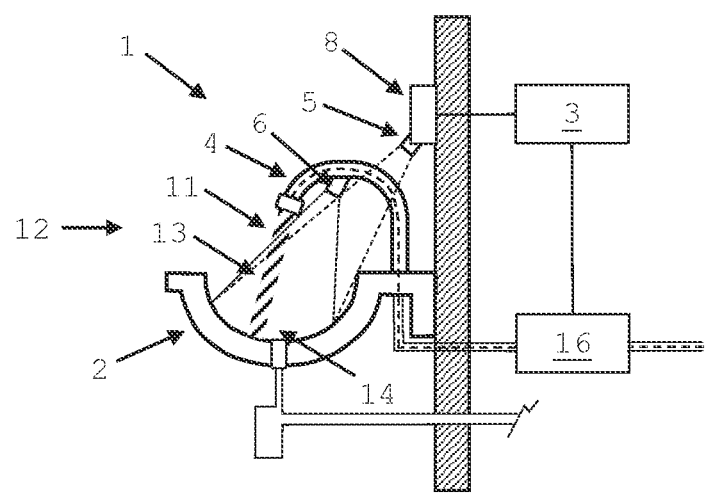
FIG. 4 shows a schematic representation of a fourth exemplary embodiment of a fitting according to the invention for a sanitary installation, such as a washbasin in a bathroom or public washroom.

FIG. 3 shows a schematic representation of a third exemplary embodiment of a fitting 1 according to the invention for a sanitary installation, such as a washbasin 2 in a bathroom. The signal (e.g. image or film or video) recorded by the imaging sensor 5 (e.g. camera) is transmitted to an image processing unit 8 for object recognition. The image processing unit 8 may be located directly at the imaging sensor 5 (e.g., in a common electronic module) or it may be a separate unit located, e.g., remote from the outlet tube. The signal/data transmission between the imaging sensor 5 (e.g. camera) and the image processing unit 8 can be via cable or wireless (shown as "radio flash" in FIG. 3). For example, the image processing unit 8 can be located at the control unit 3 (e.g., in a common electronic module or both are implemented by a common processor). Alternatively, however, the object recognition can also be performed, for example, in a remote server, such as a cloud server 10. The connection there can be partly wireless (e.g. via IR, Bluetooth, WLAN, mobile radio) or also wired (e.g. via Controller Area Network (CAN) bus, Ethernet), in particular via Internet. To enable wireless connection of the imaging sensor 5 (e.g. camera), the fitting 1 additionally comprises a wireless communication unit 9 (transmitter/receiver, transceiver).

FIG. 3 shows a schematic representation of a fourth exemplary embodiment of a fitting 1 according to the invention for a sanitary installation, such as a washbasin 2 in a bathroom. Compared to the third exemplary embodiment according to FIG. 3, here the imaging sensor 5 (e.g. camera) is not arranged on the outlet pipe 4, but is mounted on a wall and oriented in the direction of the inlet region 13 (as well as the outlet region 14). In addition, the fitting 1 comprises an illumination unit 6, which is arranged on the outlet pipe 4. This serves to illuminate the inlet region 13 (as well as the outlet region 14) so that the imaging sensor 5 can record an image with as high a contrast as possible, which facilitates object recognition. The light emitted by the illumination unit 6 is adapted to the detection area of the imaging sensor 5. However, the illumination unit 6 can also serve as working illumination for the user as well as, for example, as a display/indicator—e.g. red light means hot water and blue light means cold water, and a flashing light indicates a malfunction.

For example, as part of object recognition, object classification is performed to assign an object to a particular class from a variety of predefined classes. Each object class comprises a certain type of object, such as kitchen utensils (e.g. plates, glasses, cups, cutlery, cooking pots, pans, etc.) or limbs (e.g. hands, fingers, arms, feet or legs) of a user of the fitting or cleaning utensils (e.g. cleaning brush, cleaning sponge, steel wool or cleaning cloth). Depending on the detected object, various actions of the sanitary element can then be triggered, i.e., each object (or each type of object) is assigned a specific action.

Object recognition can be carried out in particular by means of a neural net or network. The neural network was trained for this purpose before the fitting was put into operation (e.g. by the manufacturer of the fitting). This means that the settings of the neural network were determined e.g. with the help of training data. The training data for training the neural network consist of output signals/data of the imaging sensor 5 as well as an assignment to a specified (known) object (called "data labeling" in the field of machine learning). The training of the neural network is performed offline as mentioned above and is typically carried out using powerful computers (e.g. in the cloud) and specialized software tools. Local object recognition (e.g., by "inference" using the neural network) at the fitting has the advantage that the recorded images do not have to be transmitted to an external server, which is preferred especially for data protection reasons as well as to preserve privacy. It is conceivable that the user records training data for new objects to be recognized by means of the imaging sensor and transmits these to an (automatic) service, which sends back to the user new settings (e.g. in the form of a "TensorFlow Lite" model) for the neural network or new firmware for object recognition or classification.

FIGS. 5 to 8 now show how various objects can be detected with the aid of the fitting according to the embodiment variant shown in FIG. 2, which then lead to correspondingly assigned actions of the sanitary element.

Figure 5:
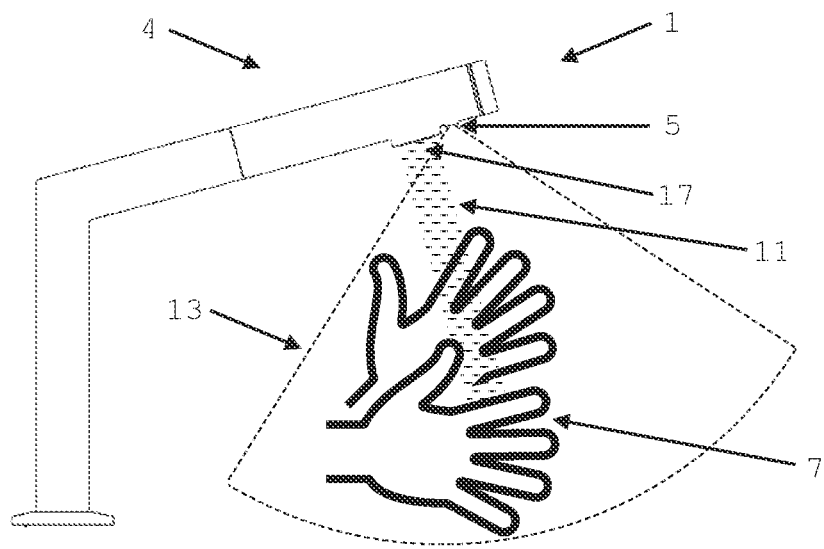
FIG. 5 shows a representation of the second exemplary embodiment illustrating a use case for hand washing.

In FIG. 5, a user holds his hands 7 under the water faucet 4. As soon as the camera 5 detects the hands 7 in the inlet region 13, the water 11 is turned on. When the user removes his hands 7 from the inlet region 13, the water 11 is turned off again. Hand movements (e.g., certain gestures) can also be used to trigger various additional actions, such as setting water warmer/cooler, increasing/decreasing the strength of the water delivery, turning the shower on/off. Gesture evaluation recognizes certain movement patterns (direction/speed) in particular. For example, opening the hand/hands (from first to outstretched fingers) can trigger the action of dispensing a portion of soap or disinfectant.

Figure 6:
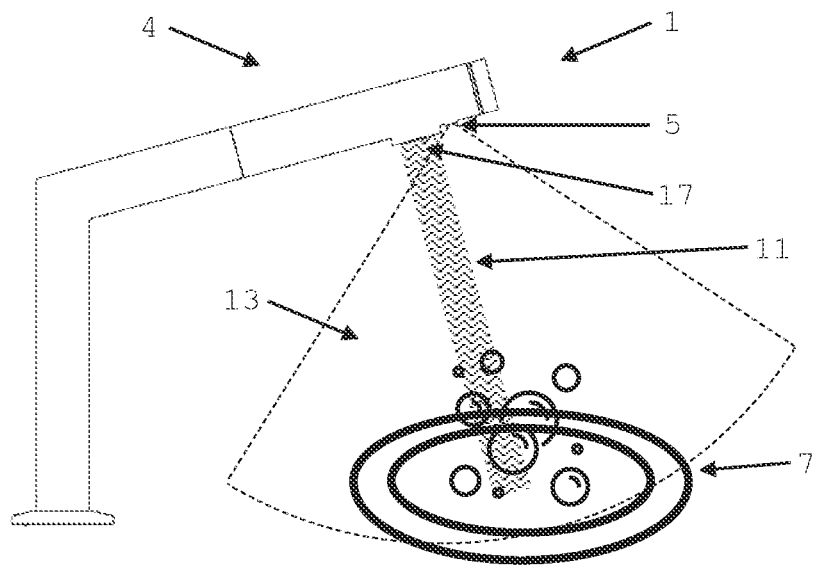
FIG. 6 shows a representation of the second exemplary embodiment illustrating a use case for washing dirty dishes.

In FIG. 6, a user holds a dirty plate 7 under the faucet 4. As soon as the camera 5 detects the dirty plate 7 in the inlet region 13, (instead of cold) warm/hot water 11 is switched on. Additionally, dishwashing detergent can be added to the water 11—especially if the plate 7 is detected as (heavily) soiled, because the object recognition also allows to determine properties of an object, such as the degree of soiling. Again, the water 11 is switched off as soon as the user removes the (now clean) plate 7 from the inlet region 13.

Figure 7:
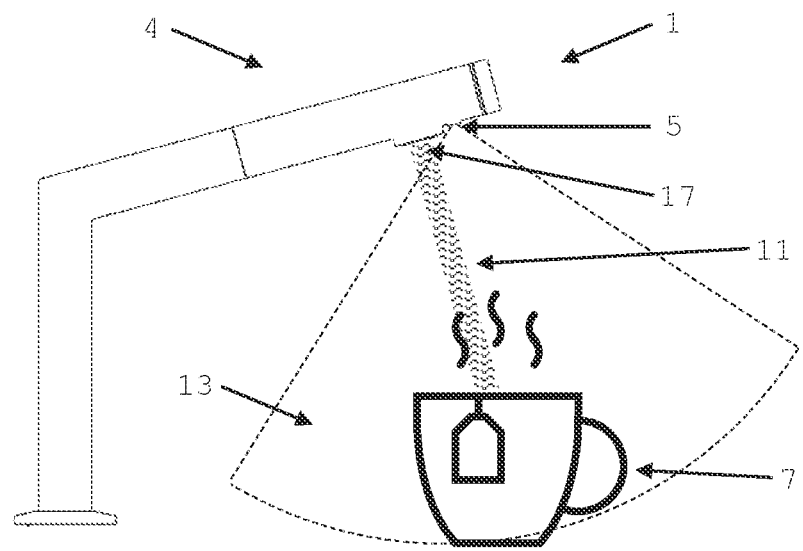
FIG. 7 shows a representation of the second exemplary embodiment illustrating a use case for filling a tea cup with hot water.

In FIG. 7, a user holds a tea cup 7 under the faucet 4. As soon as the camera 5 detects the tea cup 7 in the inlet region 13, hot/boiling water 11 is turned on. The object recognition also makes it possible to determine properties of the object, such as its transparency, color and/or size. On the one hand, this makes it possible to distinguish between cups of different sizes and colors, e.g. made of glass or ceramic, so that the corresponding amount of hot/boiling water is also filled. The filling can also be interrupted by pulling the cup 7 away from the water jet. As soon as the fitting 1 registers that the distance between the water jet and the cup rim changes or that this distance falls below a certain value, the water 11 is automatically switched off. For safety reasons, the boiling water 11 can also be switched off immediately as soon as a user's hand is detected in the inlet region 13 (→emergency shutdown safety function).

Figure 8:
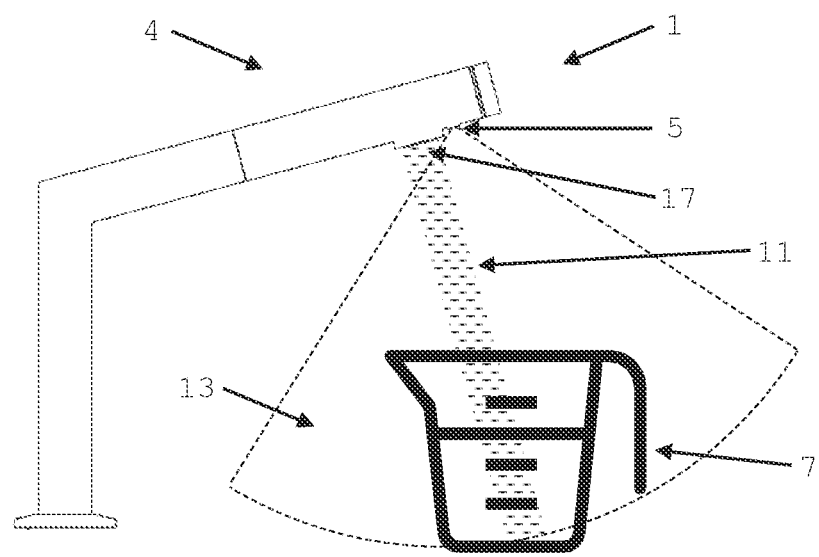
FIG. 8 shows a representation of the second exemplary embodiment illustrating a use case for filling a measuring cup with cold water.

In FIG. 8, a user holds a measuring cup 7 under the water faucet 4. As soon as the camera 5 detects the measuring cup 7 in the inlet region 13, cold water 11 is switched on. In addition, the user can indicate how much the measuring cup 7 should be filled with water 11 (e.g., one-quarter full, one-half full, three-quarters full, or completely full) by holding out his hand with, for example, 1 to 4 fingers extended. If the user instead holds a cooking pot with both hands under the water tap 4 in the inlet region 13, this is filled with water 11 until the cooking pot is pulled away from the water jet again.

Figure 9:
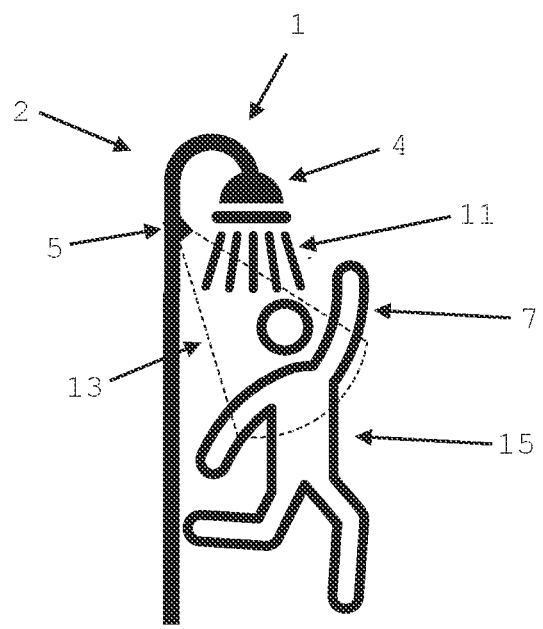
FIG. 9 shows a schematic representation of a fifth exemplary embodiment of a fitting according to the invention for a sanitary installation, such as a shower in a bathroom or public shower room.

FIG. 9 shows an application of the fitting 1 according to the invention in a shower 2. As soon as the camera 5 recognizes a person 15 or, in particular his head or upper body 7 under the shower in the inlet region 13, water 11 is let run. The person 15 can adjust the temperature as well as the strength of the water jet, for example, by hand gestures. It is also possible to adjust the position (e.g. height above the head) and/or the orientation of the shower head to the person and, if necessary, also to track them.

Analogous to the embodiments for the application for a shower, the fitting according to the invention can also be used for a hand or hair dryer mounted on a wall, wherein the air flow can be switched on and off and the temperature and strength (as well as direction) can be regulated depending on the object recognition.

Figure 10:
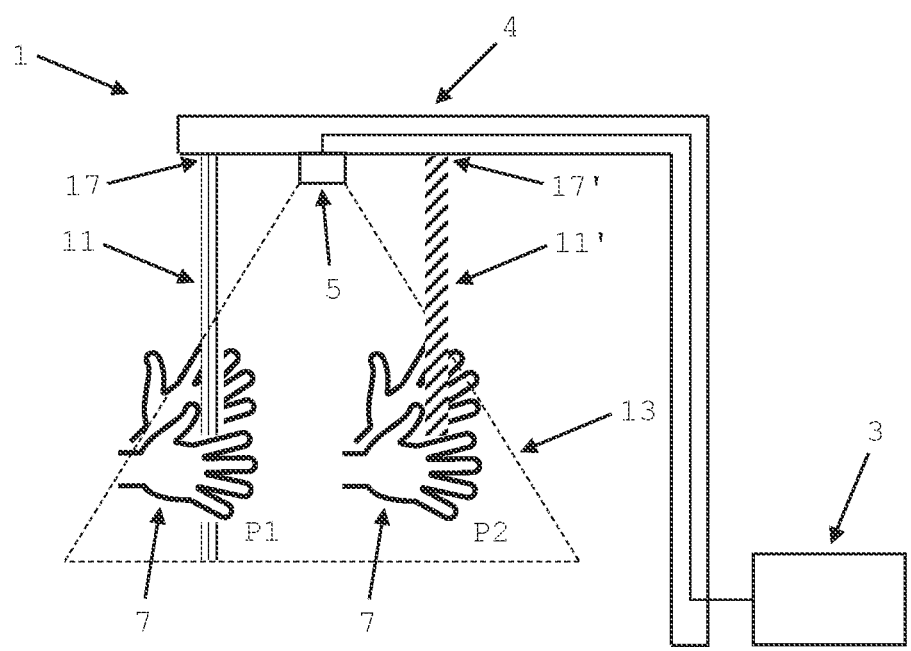
FIG. 10 shows a schematic representation of a sixth exemplary embodiment of a fitting according to the invention for a sanitary installation with two outlets for two different liquids.

FIG. 10 shows a schematic representation of a sixth exemplary embodiment of a fitting 1 according to the invention for a sanitary installation. In an extension of the first exemplary embodiment according to FIG. 1, this variant has two liquid outlets 17, 17' for two different liquids 11, 11', wherein the first liquid 11 can be, for example, water and the second liquid 11' can be, for example, soap or an (alcoholic) hand disinfectant. If the user holds the hands 7 in the inlet region 13, which is detected and monitored by the imaging sensor 5, under the first outlet 17 at the position P1, this is detected by the object recognition system and the valve for the first liquid 11 is opened via the control unit 3, so that water 11 flows, for example, to wash the hands 7. If the user now moves the hands 7 within the inlet region 13 from the position P1 to the position P2 below the second outlet 17', this is detected by the image processing unit, whereupon the control unit 3 immediately closes the valve for the first liquid 11 and briefly opens the valve for the second liquid 11', e.g. to dispense a specified amount of soap or disinfectant. The second liquid 11' can also be dispensed, for example, via a second pipe with the second liquid outlet 17', which is arranged, for example, laterally (and towards the rear) offset with respect to the pipe for the first liquid 11. The image processing unit is thereby able to determine the positions P1 and P2 of the object 7 (e.g. hands), and the control unit 3 performs different actions depending on the respective position P1, P2 of the object 7 (e.g. hands).

If a certain (new, previously unknown) object is to be recognized, corresponding images (or film or videos) can be taken by the user as training data with the camera of the fitting (or with another camera, e.g. of a smartphone). This data can be transmitted to a server, as mentioned above, which then returns an appropriately trained neural network to the fitting (e.g., in the form of a "TensorFlow Lite" model). The assignment of a certain object (or a gesture concerning this object) to a certain action can be done or changed by the user himself, for example by means of a web app or an app on his smartphone.

Further areas of application of the fitting according to the invention are conceivable, for example, in beverage dispensers or automatic washing systems. Depending on the detected container (large, small, transparent, of a certain color), different beverages are dispensed in the beverage vending machines, e.g. pure water, sparkling water, tea, coffee, soup, etc.

The proposed fitting can be used both in the private sector and in public sanitary facilities, although for the private sector application a much higher degree of personalization is possible, as well as a greater variety of different actions. For the public sector, however, the proposed fitting also has the advantage that an installer, plumber or service technician can configure the system without a control element simply by using the built-in imaging sensor (e.g. camera), and does not need a special configuration/programming device to do so.

LIST OF REFERENCE NUMERALS

1 Fitting, outlet fitting, water faucet, shower inlet fitting
2 Sanitary installation, sink, shower
3 Control unit, processor
4 Sanitary element, (outlet) pipe with valve
5 Imaging sensor, (2D/3D) camera
6 Illumination unit, display/indicator
7 Object, hands, dishes, kitchen utensils, head
8 Image processing unit, processor
9 Communication unit, transmitter/receiver (transceiver)
10 (Cloud) server
11, 11' Liquid (water, disinfectant, soap)
12 Fitting arrangement
13 Inlet region
14 Outlet region
15 User
16 Valve
17, 17' (Liquid) outlet
P1, P2 Position

The invention claimed is:

1. A fitting (1) for a sanitary installation (2), comprising:
a control unit (3);
a sanitary element (4) controllable with the control unit (3); and
at least one imaging sensor (5), wherein the control unit (3) selectively triggers an action of the sanitary element (4) in response to an object recognition performed by an image processing unit (8) for recognizing at least one object (7) in a scene represented by at least one output signal from the at least one imaging sensor (5).

2. The fitting (1) according to claim 1, wherein the at least one imaging sensor (5) is a 2D or 3D camera, a thermal imaging camera, an ultrasonic sensor, a radar sensor, or a laser distance measuring sensor, or a combination of said sensor types.

3. The fitting (1) according to claim 1, further comprising an illumination unit (6) for illuminating objects (7), wherein the illumination unit (6) comprises one or more LEDs or laser diodes or a UV or IR light source.

4. The fitting (1) according to claim 1, wherein the image processing unit (8) is positioned remotely, and the fitting (1) further comprises a communication unit (9) for sending the at least one output signal from the at least one imaging sensor (5) to the image processing unit (8) for object recognition and for receiving a result of the object recognition.

5. The fitting (1) according to claim 1, wherein the image processing unit (8) performs the object recognition using a neural network trained before the fitting (1) is put into operation.

6. The fitting (1) according to claim 1, wherein the image processing unit (8) performs an object classification as part of the object recognition to assign an object (7) to a specific class from a plurality of predefined classes.

7. The fitting (1) according to claim 6, wherein the predefined classes include kitchen utensils, or cleaning utensils.

8. The fitting (1) according to claim 1, wherein the image processing unit (8) determines at least one property of an object (7).

9. The fitting (1) according to claim 1, wherein the image processing unit (8) determines a position, in particular relative to a reference position of an object (7) and/or a movement of the object (7).

10. The fitting (1) according to claim 1, wherein the control unit (3) triggers a specific action of the sanitary element (4) based on an object classification and/or a property of an object (7) and/or a position of the object (7) and/or a movement of the object (7).

11. The fitting (1) according to claim 10, wherein one or more of the following actions are triggerable:
selecting a preset of the sanitary element (4) and executing a behavior of the sanitary element (4) defined according to the preset;
dispensing a specified amount of a fluid (11);
dispensing a specified amount of the fluid (11) per unit of time;
dispensing the fluid (11) with a preset maximum, minimum or preferred temperature of the fluid (11) to be dispensed;
dispensing the specific fluid (11) from a plurality of different fluids, in particular depending on a position of the object (7);
switching on and/or off the delivery of the fluid (11).

12. A fitting arrangement (12), comprising a sanitary installation (2) and a fitting (1) according to claim 1, wherein the imaging sensor (5) is arranged such that an inlet region (13) for dispensing a fluid (11) and/or an outlet region (14) for leading away the dispensed fluid (11) of the fitting (1) is/are detectable by the imaging sensor (8).

13. The fitting arrangement (12) according to claim 12, wherein the sanitary installation (2) is a sink or washtub, bidet, shower, bathtub, soap dispenser, lotion dispenser, sanitizer dispenser, hand dryer, hair dryer, toilet, shower toilet, urinal, or wash station.

14. A method for triggering an action of a sanitary element (4) of a fitting (1), comprising the steps of:
    detecting a scene at the sanitary element (4) with at least one imaging sensor (5) at an inlet region (13) and/or an outlet region (14) of the fitting (1), wherein the scene is detected using one or more images as output of the at least one imaging sensor (8), wherein, when more than one images are used, the images these are recorded staggered in time or from different viewing angles;
    performing object recognition for recognizing at least one object (7); and
    triggering an action of the sanitary element (4) depending on the object recognition.

15. The method according to claim 14, wherein the scene is illuminated by an illumination unit (6), the illumination device comprising one or more LEDs or laser diodes or a UV or IR light source.

16. The method according to claim 14, wherein the scene detected with the at least one imaging sensor (5) is sent as an output of the at least one imaging sensor (5) to a remote image processing unit (8) for object recognition, and a result of the object recognition is received from the remote image processing unit (8).

17. The method according to claim 14, wherein the object recognition is performed by a neural network trained before the fitting (1) is put into operation.

18. The method according to claim 14, wherein as part of the object recognition, an object classification is performed to assign the object (7) to a particular class from a plurality of predefined classes.

19. The method according to claim 18, wherein different classes of kitchen utensils or cleaning utensils are recognized by the object classification.

20. The method according to claim 14, wherein at least one property of an object (7) is determined.

21. The method according to claim 14, wherein a position relative to a reference position of the object (Z) and/or a movement of the object (7) is determined.

22. The method according to claim 19, wherein a specific action of the sanitary element (4) is triggered based on an object classification and/or a property of the object (7) and/or a position of the object (7) and/or a movement of the object (7).

23. The method according to claim 22, wherein the action comprises at least one of the following:
    selecting a preset of the sanitary element (4) and executing a behavior of the sanitary element (4) defined according to the preset;
    dispensing a specified amount of a fluid (11);
    dispensing a specified amount of the fluid (11) per unit of time;
    dispensing the fluid (11) with a preset maximum, minimum or preferred temperature of the fluid (11) to be dispensed;
    dispensing a specific fluid (11) from a plurality of different fluids depending on a position of the object (7);
    switching on and/or off the delivery of the fluid (11).

* * * * *